June 17, 1930.   F. S. COLVIN ET AL   1,763,883
FRUIT TUMBLER AND CONVEYER
Filed May 8, 1929
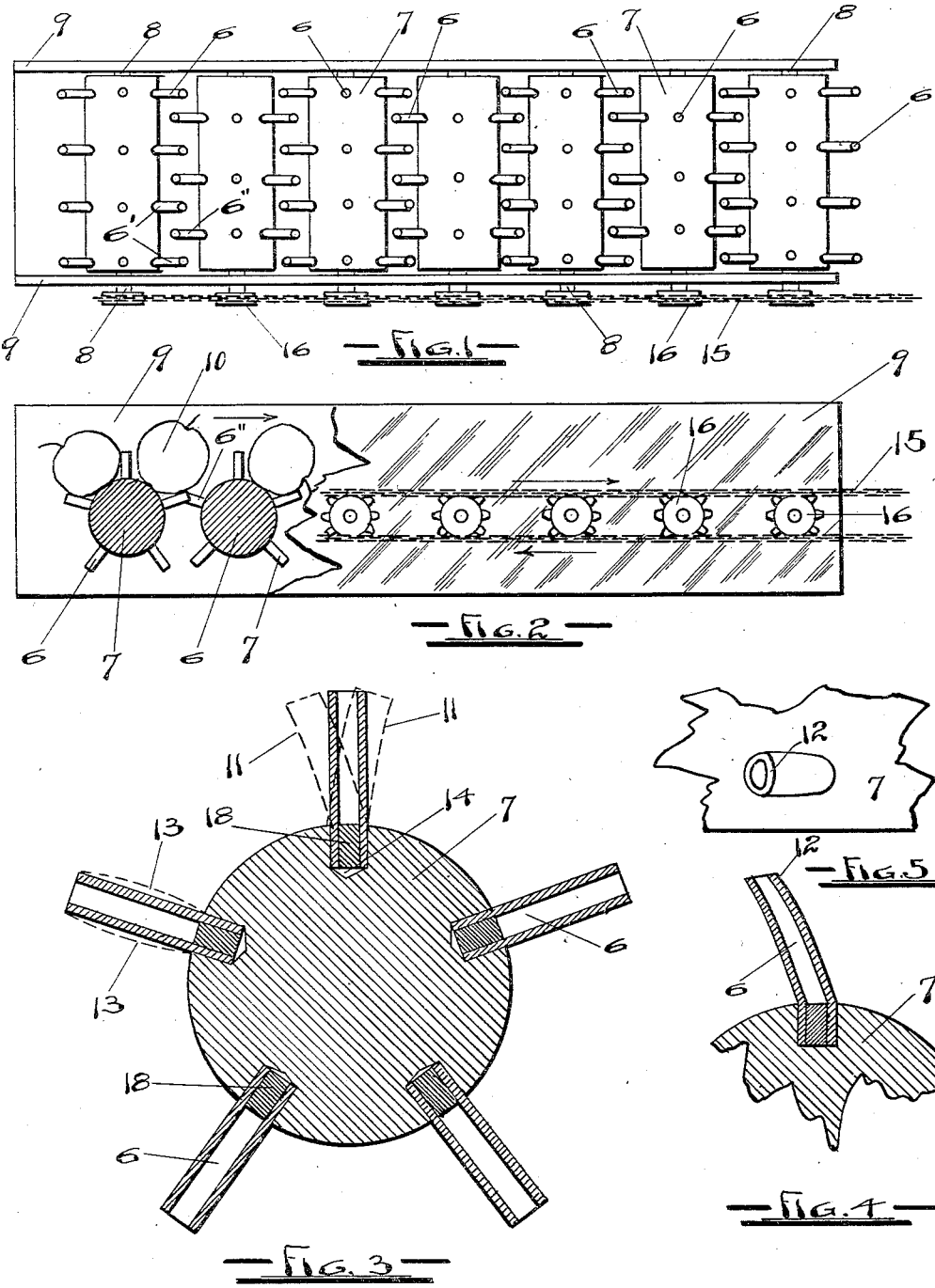
INVENTORS
FRED S. COLVIN
JOHN V. ROGERS
BY C. F. Blake ATTY.

Patented June 17, 1930

1,763,883

UNITED STATES PATENT OFFICE

FRED S. COLVIN AND JOHN V. ROGERS, OF YAKIMA, WASHINGTON

FRUIT TUMBLER AND CONVEYER

Application filed May 8, 1929. Serial No. 361,360.

Our invention relates to conveyers in general, and particularly to such conveyers as are adapted to turn and tumble the material thereon around as it travels, such conveyers being especially adaptable to fruit treating machines. The object of our invention is to provide such a conveyer of simple and economical construction that will effectively so turn and tumble the fruit as to subject every side and portion of each individual piece thereof to the treatment to which the fruit is being subjected. We accomplish this object by means of the construction illustrated in the accompanying drawing, which is a part of this application for Letters Patent, like characters of reference indicating like parts throughout the several views thereof, and in which:

Fig. 1 is a plan view of our device.

Fig. 2 is a side elevation thereof, partly broken away.

Fig. 3 is a cross section of one of the conveyer rolls, shown upon an enlarged scale.

Fig. 4 is a fragmentary section of one of the roll fingers.

Fig. 5 is a plan view of the subject matter of Fig. 4.

In our invention we utilize a plurality of parallel rollers mounted upon stationary bearings within a suitable frame, each roller being provided with a plurality of longitudinally positioned rows of spaced radial fingers, the fingers of any one of said rollers passing through the interdigital spaces of the adjacent rollers as the said rollers rotate. We are aware that such a construction is old in the art, and our invention lies in the combination of suitable materials and forms of construction that render our conveyer especially suitable for fruit treating machines.

In the treatment of fruit certain acid baths or washers are used and the form of construction and materials of construction must be such that great resistance is presented to such acid for the purpose of prolonging the life of the conveyer. Also the fruit being delicate the materials and form of construction must be such as will most effectively provide against any injury to the fruit as it is being moved on the conveyer. This requires a yieldable form of fingers upon the rollers.

Such fingers are most conveniently constructed of rubber, and are secured upon the rolls in a plurality of longitudinal rows as shown at 6 in Fig. 1. The rolls are conveniently constructed of wood 7, and are provided with wooden spindles 8 which are rotatably mounted upon suitable frames 9.

In Fig. 2 the fruit is shown as it is entering the conveyer. Let the action of the conveyer upon a single piece of fruit, such as that designated 10 in Fig. 2, be considered. The fruit is resting upon two fingers designated as 6' in Fig. 1, and is about to be transferred to the finger 6'' of the succeeding roller. It will thereupon roll around said finger 6'' until it comes to rest between two other fingers upon the roller respective to said finger 6''. Thus the passage of the fruit upon the conveyer will be a succession of rolls and tumbles from roller to roller and finger to finger of the rollers. From Fig. 2 it is obvious that the piece of fruit designated as 10 is about to be picked up by the finger 6'', and that it will roll upon said finger towards the roller respective thereto, and will come into more or less violent contact with said roll, possibly damaging the piece of fruit. To avoid such damage is one object of making the fingers yieldable, so that the finger 6'' will yield sufficiently, as shown in dotted lines 11 in Fig. 3, to reduce the violence of the contact of the fruit with the roller to a point at which the fruit will sustain no damage.

To further enhance the yieldability of the fingers we make them preferably of hollow tubular type as shown in Fig. 3. By this construction each finger as it contacts with a piece of fruit partially collapses at the end of the finger, the cross section at that point of the finger becoming slightly flattened at the side in contact with the fruit, as illustrated at 12 in Figs. 4 and 5. Furthermore it sometimes happens that an especially small piece of fruit will be deposited upon the end of the finger 6", and if the finger is not then yieldable longitudinally thereof it will damage the fruit, even sometimes puncturing the same. But with the hollow yieldable fingers of our device a finger receiving a piece of fruit upon the end thereof will yield longitudinally of the finger as shown in dotted lines 13 in Fig. 3. Thus the three methods of yielding of the fingers shown in Figs. 3, 4 and 5, and described above provide adequate protection of the fruit from damage by the conveyer.

The hollow fingers are preferably composed of rubber, and are mounted in place upon the rollers by inserting them into orifices 14 in the rolls, and then forcing a plug of wood or other suitable material into the finger and down into the said orifice, thereby securing the finger therein in a manner that presents no metal or other material to the acid bath that would be too greatly affected thereby.

Furthermore in materializing our invention we discovered that the number of rows of fingers longitudinally positioned upon the rollers has a great effect upon the rolling and tumbling of the fruit about upon the conveyer, and also in the transferring of the fruit from one roller to the succeeding roller. Various numbers of such rows of fingers were experimented with, and it was found that five longitudinal rows of fingers was greatly preferable to any other arrangement. The device is thus shown in the drawing.

The rollers may be rotated in unison by means of any convenient and suitable mechanism, that shown in the drawing being a chain 15 mounted upon and operating sprockets 16 upon projections of the journals 8 of the rollers, and said chain being operated from any convenient source of power, not shown in the drawing.

Our invention may be made of any size, and constructed of any material deemed convenient and suitable for a device of this character, and while we have illustrated and described a form of construction and arrangement of parts found desirable in materializing our invention, we wish to include in this application all mechanical equivalents and substitutes that may fairly be considered to come within the scope and purview of our invention as defined in the appended claims.

Having disclosed our invention so that others may be enabled to construct and to use the same, what we claim as new and desire to secure by Letters Patent is:

1. In a conveyer: a plurality of rotatable rollers; radially projecting fingers upon said rollers, said fingers being yieldable transversely thereof, axially thereof, and in cross section thereof at the finger extremity.

2. In a conveyer: a plurality of rotatable rollers; radially projecting fingers upon said rollers, said fingers being yieldable transversely thereof.

3. In a conveyer: a plurality of rotatable rollers; radially projecting fingers upon said rollers, said fingers being yieldable axially thereof.

4. In a conveyer: a plurality of rotatable rollers; radially projecting fingers upon said rollers, said fingers being yieldable in cross section thereof at the finger extremity.

5. In a conveyer: a plurality of rotatable rollers; fingers longitudinally spaced in rows longitudinal of said rollers, said fingers being yieldable transversely thereof, axially thereof, and in cross section thereof at the finger extremity.

6. In a conveyer: a plurality of rollers; fingers longitudinally spaced in rows longitudinal of said rollers, said fingers being yieldable transversely thereof.

7. In a conveyer: a plurality of rollers; fingers longitudinally spaced in rows longitudinal of said rollers, said fingers being yieldable axially thereof.

8. In a conveyer: a plurality of rollers; fingers longitudinally spaced in rows longitudinal of said rollers, said fingers being yieldable in cross section thereof at the finger extremities.

9. In a conveyer: a plurality of rollers; five series of fingers upon each of said rollers, each of said series being positioned longitudinally of the roller, and the fingers thereof being yieldable transversely thereof, axially thereof, and in cross section thereof at the finger extremity.

10. In a conveyer: a plurality of rollers; five series of fingers upon each of said rollers, each of said series being positioned longitudinally of the roller, and the fingers being yieldable transversely thereof.

11. In a conveyer: a plurality of rollers; five series of fingers upon each of said rollers, each of said series being positioned longitudinally of the roller, and the fingers being yieldable axially thereof.

12. In a conveyer: a plurality of rollers; five series of fingers upon each of said rollers, each of said series being positioned longitudinally of the roller, and the fingers being yieldable in cross section at the extremity thereof.

13. In a conveyer: a roller having a plurality of orifices in the surface thereof; a hollow yieldable cylindrical finger mounted in each of said orifices; and a plug inserted into each of said fingers at the end thereof within the respective orifice for the purpose of securing the finger within the orifice.

14. In a conveyer to support and advance and turn fruit; the combination of a series of rotatable rollers and intercurrent fingers thereon, each of said fingers being yieldable in every direction.

In witness whereof we claim the foregoing jointly as our own, we hereunto affix our signatures at Yakima, county of Yakima, State of Washington, this 27th day of April, 1929.

FRED S. COLVIN.
JOHN V. ROGERS.